United States Patent
Iwashita et al.

(10) Patent No.: US 7,863,853 B2
(45) Date of Patent: Jan. 4, 2011

(54) ELECTRIC MOTOR CONTROL DEVICE

(75) Inventors: Yasusuke Iwashita, Yamanashi (JP);
Takahiro Akiyama, Yamanashi (JP);
Masakazu Niwa, Yamanashi (JP);
Tomohisa Tsutsumi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 395 days.

(21) Appl. No.: 12/132,103

(22) Filed: Jun. 3, 2008

(65) Prior Publication Data
US 2008/0303476 A1 Dec. 11, 2008

(30) Foreign Application Priority Data
Jun. 5, 2007 (JP) .............................. 2007-149636

(51) Int. Cl.
*H02P 1/26* (2006.01)
(52) U.S. Cl. ...................... 318/766; 318/727; 318/778; 318/779
(58) Field of Classification Search ................. 318/766, 318/727, 778, 779
See application file for complete search history.

(56) References Cited

U.S. PATENT DOCUMENTS 5,659,235 A * 8/1997 Yamada et al. .............. 318/801
6,275,000 B1 * 8/2001 Nishimura ................... 318/811

FOREIGN PATENT DOCUMENTS

JP 61-199487 B2 9/1986

* cited by examiner

*Primary Examiner*—Walter Benson
*Assistant Examiner*—David S Luo
(74) *Attorney, Agent, or Firm*—Lowe Hauptman Ham & Berner LLP

(57) ABSTRACT

An excitation current processor of a current controller processes the excitation current corresponding to the magnetic flux instruction from the magnetic flux instruction processor. It multiplies this excitation current with a boost coefficient to obtain an excitation current instruction. Here, the boost coefficient is determined based on the difference obtained by subtracting the magnetic flux estimation value processed by the magnetic flux processor based on the excitation current feedback from the voltage conversion device from the magnetic flux instruction input from the magnetic flux instruction processor. Further, the boost coefficient can be found from the function of time from the start of the rise of the magnetic flux.

10 Claims, 9 Drawing Sheets

FIG.3

(a) CURRENT INSTRUCTION AT RISE OF MAGNETIC FLUX (INTERVAL 1)

(b) CURRENT INSTRUCTION AFTER RISE OF MAGNETIC FLUX (INTERVAL 2)

ELECTRIC MOTOR CONTROL DEVICE

RELATED APPLICATIONS

The present application is based on, and claims priority from, Japanese Application Number 2007-149636, filed Jun. 5, 2007, the disclosure of which is hereby incorporated by reference herein in its entirety.

BACKGROUND OF THE INVENTION

1. Field of the Invention

The present invention relates to an electric motor control device for vector control of an induction motor, more particularly relates to an electric motor control device able to speed the rise of magnetic flux and issue an excitation current instruction preventing overshoot of magnetic flux.

2. Description of the Related Art

An induction motor runs a primary current through a stator to generate a rotating magnetic field and has the magnetic flux caused by the rotating magnetic field cut across by a rotor so as to induce voltage at the rotor and cause the flow of a secondary current. It uses the interaction between this secondary current and the magnetic flux to generate torque. In the past, as the control of the induction motor, vector control dividing the primary current flowing through the stator into an excitation current of the magnetic flux direction and a secondary current, that is, a torque current, has been used. The torque generated is proportional to the product of magnetic flux generated by the excitation current and torque current.

Figure 9:
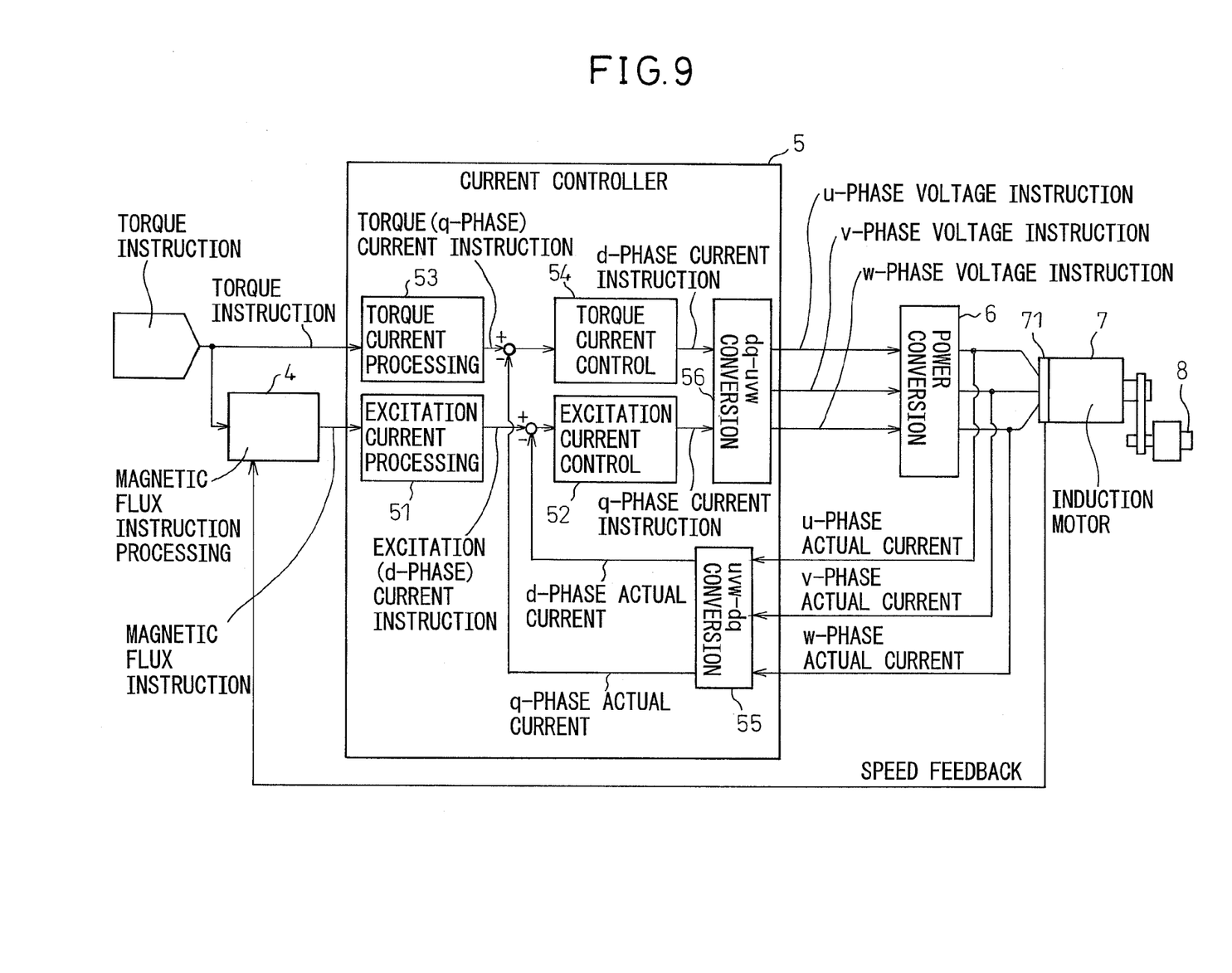
FIG. 9 is a view showing a conventional example of vector control of a general induction motor.

FIG. 9 is a view explaining vector control of a conventional induction motor. A torque instruction instructing the torque of the induction motor is input to a current controller 5 and is input to the magnetic flux instruction processor 4 for output of a magnetic flux instruction. The magnetic flux instruction is processed considering the rotational speed detected by a speed sensor 71 of an induction motor 7 in the magnetic flux instruction processor 4. The magnetic flux instruction is input in the current controller 5 in the same way as the torque instruction.

The torque instruction is input to a torque current processor 53 of the current controller 5. The torque current processor 53 processes the torque (q-phase) current instruction. The difference between the output torque current instruction and the torque actual current fed back from the voltage conversion device 6 is input to a torque current controller 54. The torque current controller 54 processes and outputs a d-phase voltage instruction to be input to a dq-uvw converter 56 in accordance with the difference of the input torque current.

On the other hand, the excitation instruction is input to an excitation current processor 51 of the current controller 5. The excitation current processor 51 outputs an excitation (d-phase) current instruction. The difference between the output excitation current instruction and the excitation actual current fed back from the voltage conversion device 6 is input to an excitation current controller 52. The excitation current controller 52 processes and outputs the q-phase voltage instruction to be input to the dq-uvw converter 56 in accordance with the difference of the input excitation current.

The dq-uvw converter 56 converts the input d-phase voltage instruction and q-phase voltage instruction to a u-phase voltage instruction, v-phase voltage instruction, and w-phase voltage instruction. The u-phase voltage instruction, v-phase voltage instruction, and w-phase voltage instruction are input to the voltage conversion device 6 as output of the current controller 5. The u-phase voltage instruction, v-phase voltage instruction, and w-phase voltage instruction input to the voltage conversion device 6 are converted by the voltage conversion device 6 to the actual currents of the uvw phases supplied to induction motor 7. The induction motor 7 is driven by the actual currents of the uvw phases. The induction motor 7 outputs the torque instructed by the torque instruction and makes the shaft 8 rotate.

Note that the actual currents of the uvw phases output from the voltage conversion device 6 are fed back to the current controller 5 where the uvw-dq converter 55 of the current controller 5 converts them to the torque (d-phase) real current and excitation (q-phase) real current which are used as the torque current feedback and excitation current feedback. Further, the speed sensor 71 of the induction motor 7 feeds back the rotational speed of the induction motor 7 to the magnetic flux instruction processor 4.

When raising the magnetic flux of such an induction motor, when changing the magnetic flux instruction for improving the response of control, etc., it is sought to quickly raise or change the magnetic flux. However, the magnetic flux generated rises by a time constant determined from a circuit constant with respect to the excitation current, so until the magnetic flux is established, it becomes delayed as compared with the excitation current.

Therefore, in the past, to shorten the rising time of magnetic flux, the practice had been to multiply the magnetic flux instruction with a certain boost coefficient to give a value larger than the instruction value for generating magnetic flux from the time of rise of the magnetic flux to when the estimation value of the magnetic flux reaches the instruction value. However, as a result of multiplication of the boost coefficient, the generated magnetic flux always overshoots. There was therefore the problem that the time until the magnetic flux instruction value was reached became extended (see Japanese Patent Publication (B2) No. 6-67253).

SUMMARY OF THE INVENTION

The present invention was made in consideration of the above problem and has as its object the provision of an electric motor control device using a value found from a function of a difference of a magnetic flux instruction value and a magnetic flux estimation value or a function of the time $t$ from the time of rise of the magnetic flux as a boost coefficient to speed the rise of the magnetic flux and prevent overshoot.

To achieve the above object, the electric motor control device of the present invention is an electric motor control device controlling an excitation current based on a magnetic flux instruction value and controlling a torque current based on a torque instruction value, comprising a coefficient processing means for processing a coefficient found as a function of a difference of the magnetic flux instruction value and a magnetic flux estimation value or a coefficient found as a function of a time from a start of rise of the magnetic flux and an excitation current processing means for processing an excitation current instruction value based on an excitation current value corresponding to the magnetic flux instruction value and a coefficient processed by the coefficient processing means, wherein the processed excitation current instruction value is used to control the excitation current from the start of rise of the magnetic flux to when the magnetic flux reaches the magnetic flux instruction value.

Furthermore, the device may be further comprised a power converter feeding drive power to an electric motor based on a torque current and excitation current, wherein the excitation current processed by the excitation current processing means is in a range where the size of the vector sum of the processed excitation current and the torque current does not exceed a maximum allowable current value of the power converter.

The excitation current processing means can process the excitation current instruction value when switching a control mode of an electric motor between a speed control mode and a position control mode.

Furthermore, the excitation current processing means can process the excitation current instruction value when switching the electric motor from a non-excitation state to an excitation state.

Furthermore, the excitation current processing means can process the excitation current instruction value when a speed instruction value for an electric motor is changed.

Furthermore, the excitation current processing means can process the excitation current instruction value when a magnetic flux instruction value for the electric motor is changed.

The electric motor control device of the present invention uses the value found from a function of the difference between the magnetic flux instruction value and the magnetic flux estimation value or a function of the time $t$ from the time of rise of the magnetic flux as a boost coefficient, so can speed the rise of the magnetic flux and prevent overshoot of the magnetic flux, so there is no longer any delay in the time by which the magnetic flux converges.

When finding the boost coefficient from the difference between the magnetic flux instruction value and the magnetic flux estimation value, the magnetic flux estimation value is fed back to process the boost coefficient, so it is possible to give an excitation current instruction in accordance with the state of the magnetic flux.

Further, when finding the boost coefficient from the time from the start of rise of the magnetic flux, the boost coefficient is processed in accordance with a time constant found from a circuit constant of the electric motor, so it is possible to give an excitation current instruction without estimating the state of the magnetic flux.

BRIEF DESCRIPTION OF DRAWINGS

These and other objects and features of the present invention will become clearer from the following description of the preferred embodiments given with reference to the attached drawings, wherein.

DESCRIPTION OF THE PREFERRED EMBODIMENTS

Below, embodiments of the present invention will be explained with reference to the drawings, but before that the principle of the present invention will be explained.

In general, the magnetic flux $\Phi$ generated in an induction motor due to an excitation current $i_d$ is not in a proportional relationship to the excitation current $i_d$. If the mutual inductance between the stator winding and rotor winding is M, one phase's worth of the secondary resistance is $R_2$, the secondary inductance is $L_2$, and the time is t, there is the relationship shown by $$\Phi = (1 - \exp((-R_2/L_2)t)) \cdot M \cdot i_d \qquad (1)$$

Therefore, the magnetic flux $\Phi$ rises by a time constant $L_2/R_2$ determined from the circuit constant with respect to the excitation current $i_d$.

The present invention considers the relationship between the magnetic flux at the time of rise of the magnetic flux shown by the formula (1) and the excitation current and changes the boost coefficient K multiplied with the magnetic flux instruction value as a function of the difference of magnetic flux or a function of time. That is, it multiples the excitation current instruction $i_d^*$ corresponding to the magnetic flux instruction with a boost coefficient K found from a function $f(x)$ of the difference $x$ between the magnetic flux instruction value and the magnetic flux estimation value estimated from the formula (1) or a function g(t) of the time $t$ from the time of rise of the magnetic flux to find a new excitation current instruction $i_d^{*\prime}$ in accordance with the formula:

$$i_d^{*\prime} = K \cdot i_d^* \qquad (2)$$

Figure 1:
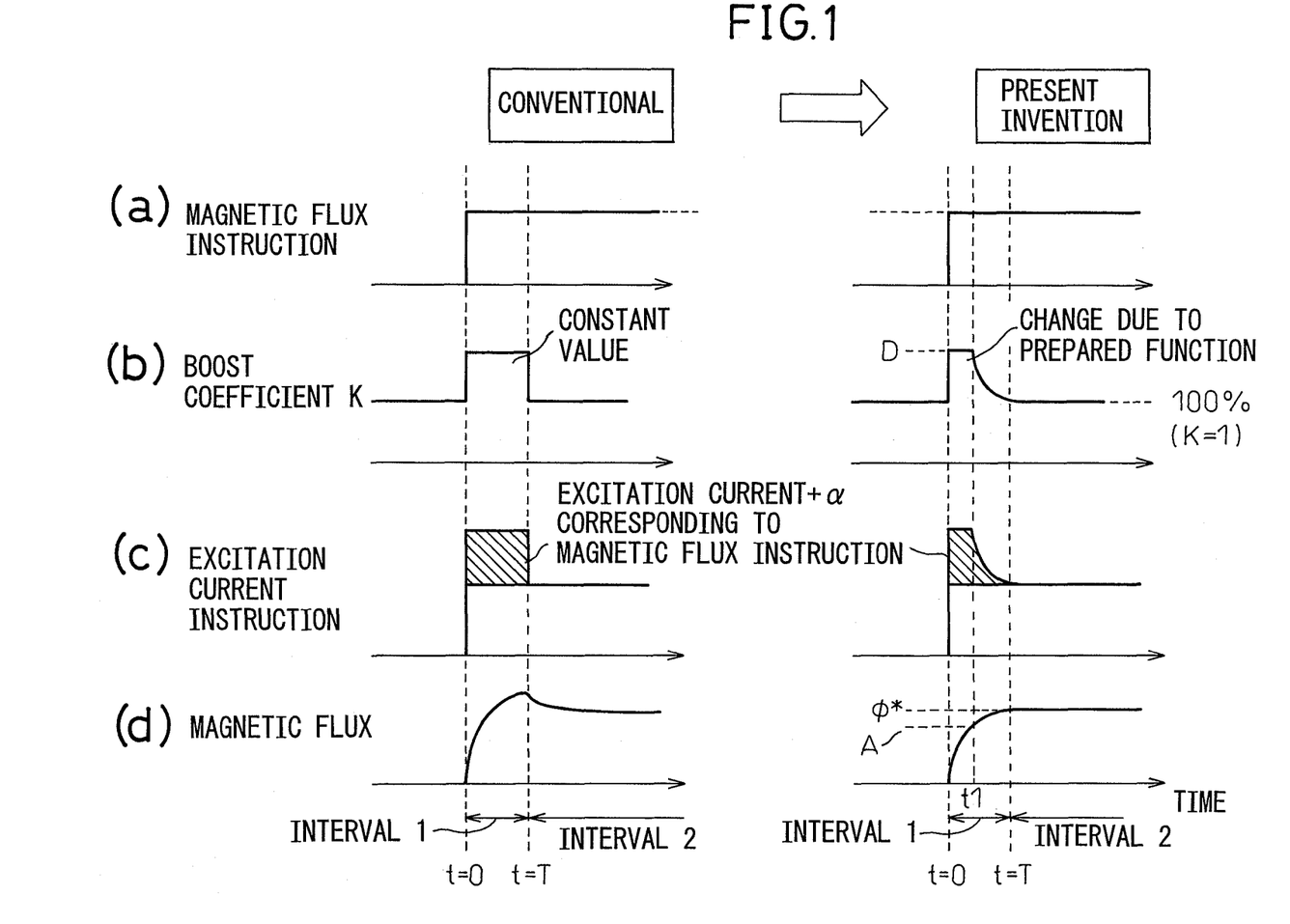
FIG. 1 is a view explaining an embodiment according to the present invention in comparison with the related art.

FIG. 1 is a view showing the difference between the case of using a boost coefficient K according to the present invention and the conventional case for explaining the action and effect of the present invention. Note that FIG. 1 is a view for explaining the action and effect of the present invention by one example and does not limit the present invention. The present invention is defined by only the claims.

In FIG. 1, the left side explains the conventional case, while the right side shows the case of the present invention. In the related art, corresponding to a magnetic flux instruction output at a time t=0 shown at (a), the boost coefficient K becomes a constant value larger than "1" by exactly a predetermined interval 1 (t=0 to T) as shown at (b). Therefore, as shown in (c), at the interval 1, the boost coefficient K(>1) is multiplied with the excitation current instruction. In the interval 1, a constant current (excitation current+α) larger than the excitation current corresponding to the magnetic flux instruction value flows. As a result, as shown in (d), the magnetic flux generated by the excitation current overshoots at the end of the interval 1 and so time is taken until the magnetic flux instruction value is converged to.

According to the present invention, the boost coefficient K(>1) becomes the maximum value at first in the interval 1 for the magnetic flux instruction at t=0, but after t=t1(<T), it is reduced to 1 in accordance with a prepared function. Therefore, as shown in (c), the excitation current flowing in the interval 1 is also not a constant value, but falls in accordance with the prepared function to a current value corresponding to the magnetic flux instruction value. As a result, as shown in (d), in the interval 1, the magnetic flux never overshoots. At the end of the interval 1, the desired magnetic flux instruction value is converged to and the time until reaching the magnetic flux instruction value is shortened.

Furthermore, when finding the boost coefficient from the difference between the magnetic flux instruction value and the magnetic flux estimation value, the magnetic flux estimation value is fed back to process the boost coefficient, so it is possible to give an excitation current instruction corresponding to the state of the magnetic flux.

Further, when finding the boost coefficient from the time from the start of the rise of the magnetic flux, the boost coefficient is processed in accordance with the time constant found from the circuit constant of the electric motor, so it is possible to give an excitation current instruction without estimating the state of the magnetic flux.

Below, embodiments and examples of the present invention will be explained referring to FIGS. 2 to 7.

Figure 2:
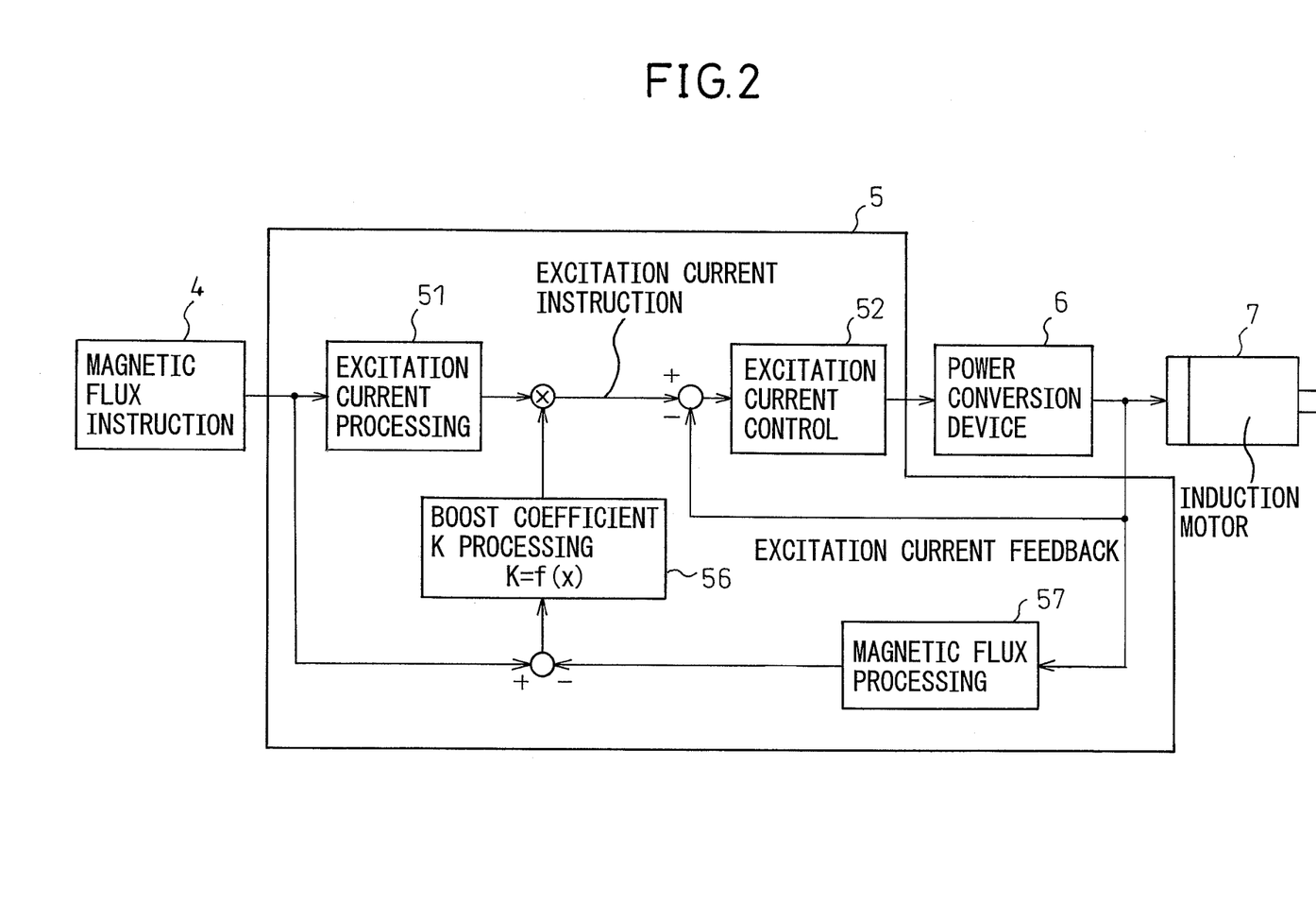
FIG. 2 is a view explaining a first embodiment of the present invention.

FIG. 2 is a view explaining the boost coefficient K found from a function f(x) of the difference x of the magnetic fluxes in a first embodiment of the present invention. In FIG. 2, the current controller 5 shows only the necessary configuration for processing a boost coefficient K for the excitation current instruction. The configurations relating to the torque current control, dq-uvw conversion and its reverse conversion, etc. are omitted. Note that to facilitate understanding, parts of the configuration similar to those in FIG. 9 explaining general vector control are assigned similar notations.

According to the magnetic flux instruction input from the magnetic flux instruction processor 4 to the current controller 5, the excitation current processor 51 calculates the excitation current corresponding to the magnetic flux instruction. The calculated excitation current is multiplied with the boost coefficient K to obtain the excitation current instruction. The boost coefficient K, as shown in FIG. 2, is determined based on the difference x obtained by subtracting the magnetic flux estimation value processed by the magnetic flux processor 57 based on the excitation current feedback from the voltage conversion device 6 from the magnetic flux instruction input from the magnetic flux instruction processor 4. The excitation current controller 52 is controlled by the difference obtained by subtracting the excitation current feedback from the voltage conversion device 6 from the excitation current instruction multiplied with this boost coefficient K, processes the excitation voltage instruction, and outputs it through a dq-uvw converter (not shown) to the voltage conversion device 6. Note that the excitation current feedback from the output of the voltage conversion device 6 corresponds to the output from the uvw-dq converter 55 of FIG. 9, that is, the excitation (d-phase) actual current.

The function f(x) determining the boost coefficient K is given as for example $f(x)=G \cdot x+1$ (where G is a constant value) as a function of the difference x of the magnetic flux instruction value and magnetic flux estimation value. However, the current conversion device 6 has the limitation that it cannot output a current over the maximum allowable current, so the boost coefficient K is given as:

$$f(x)=\mathrm{Min}\{\sqrt{(\mathrm{Imax}^2-(i_2^*)^2)}/i_d^*, G \cdot x+1\} \quad (3)$$

where
Imax: maximum allowable current,
$i_2^*$: torque current instruction, and
$i_d^*$: excitation current instruction.

Here, $\sqrt{(\mathrm{Imax}^2-(i_2^*)^2)}/i_d^*$ corresponds to the maximum value D of the boost coefficient K of FIG. 1.

That is, the boost coefficient is the smaller value of the value $\sqrt{(\mathrm{Imax}^2-(i_2^*)^2)}/i_d^*$ calculated from the maximum allowable current of the voltage conversion device 6 supplying power to the induction motor or the value $f(x)=G \cdot x+1$ calculated from the difference x.

Figure 3:
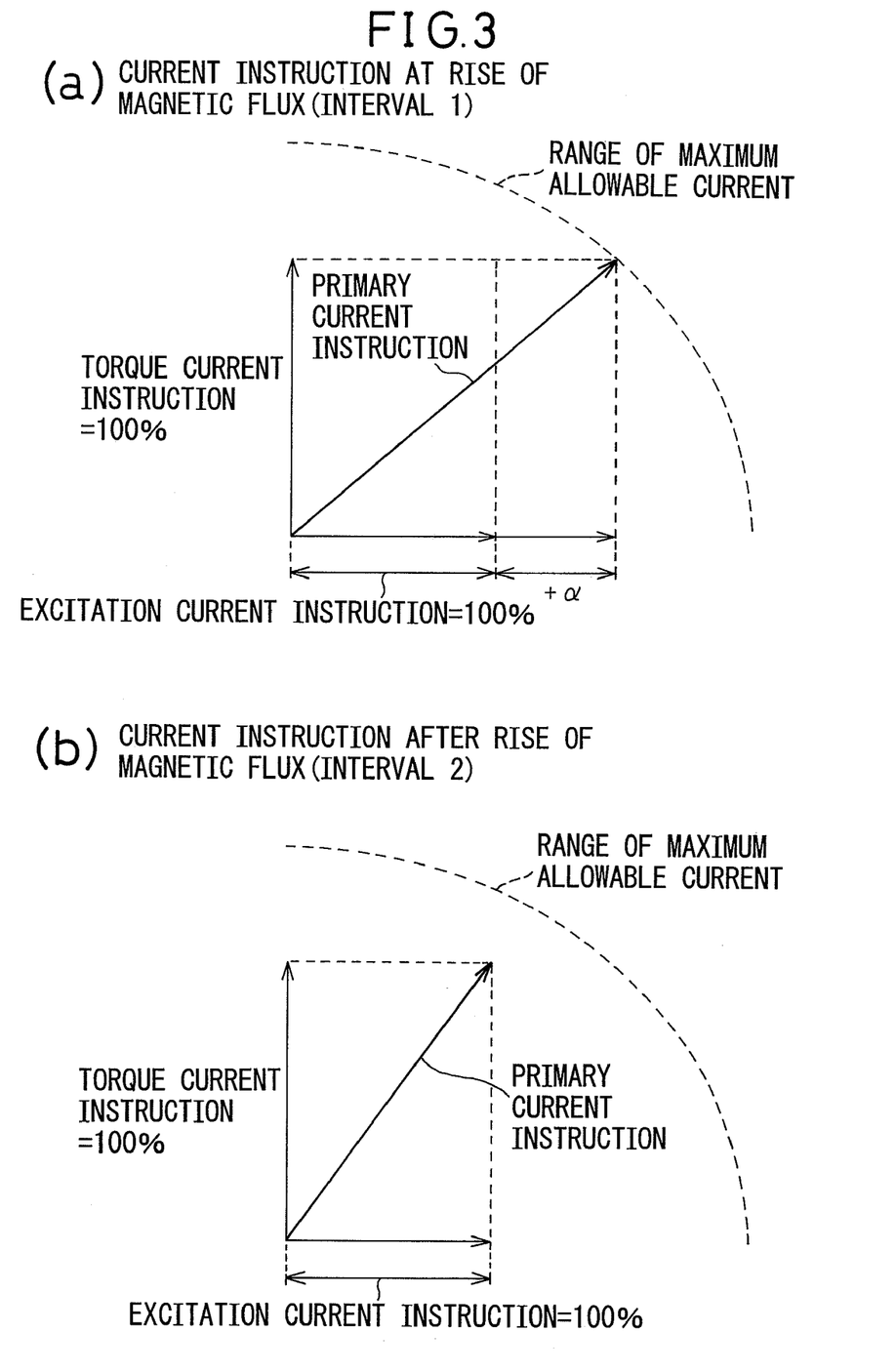
FIG. 3 is a view explaining the operation of an embodiment of the present invention.

FIG. 3(a) is a view for explaining the current instruction in the case of acceleration by the maximum allowable current at the time of the rise of the magnetic flux (interval 1), while FIG. 3(b) is a view for explaining the current instruction after the rise of the magnetic flux (interval 2).

As shown in FIG. 3(a), when rising at the maximum allowable current at the start of the interval 1, the torque current instruction is 100%, while the excitation current instruction becomes a value of 100% or more. In this case, it is possible to increase the excitation current instruction (shown by +α) until the primary current instruction obtained by vector addition of the torque current instruction and excitation current instruction becomes a maximum allowable current of the voltage conversion device.

FIG. 3(b) shows the relationship of the torque current instruction and the excitation current instruction at the interval 2 when the rise of the magnetic flux is completed. As clear from the figure, both the torque current instruction and the excitation current instruction become values of 100%. The primary current instruction obtained by adding the torque current instruction and the excitation current instruction becomes smaller than the maximum allowable current.

Figure 4:
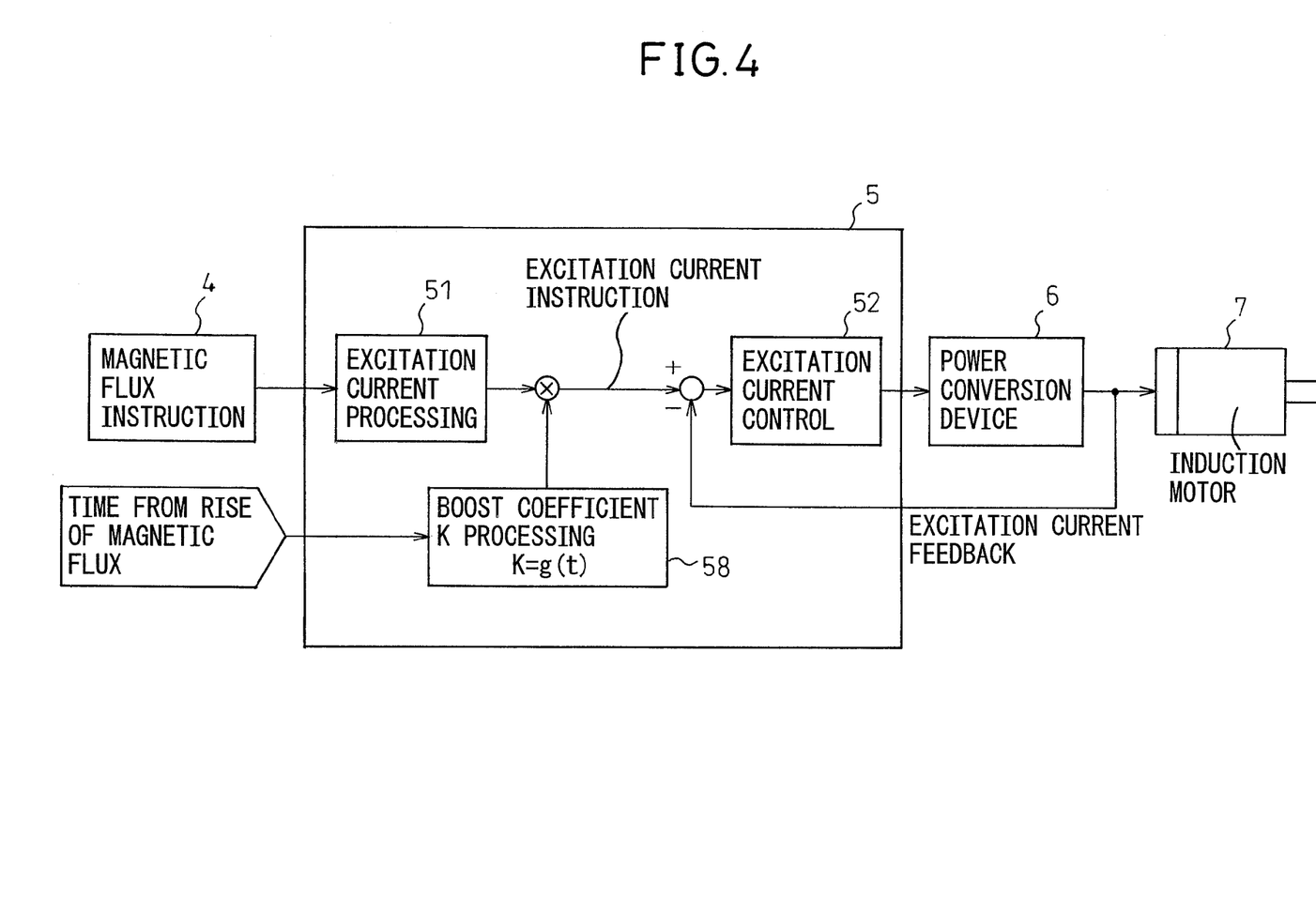
FIG. 4 is a view explaining a second embodiment of the present invention.

FIG. 4 is a view showing the boost coefficient determined from the function g(t) of the time t from the time of rise of the magnetic flux of a second embodiment of the present invention. In FIG. 4, in the same way as FIG. 2, only the configuration necessary for processing F the function g(t) is shown. The rest of the parts are omitted. Note that to facilitate understanding, configurations similar to those in FIG. 9 explaining general vector control are assigned similar notations.

As shown in FIG. 4, according to the magnetic flux instruction from the magnetic flux instruction processor 4 to the current controller 5, the excitation current processor 51 calculates the excitation current corresponding to the magnetic flux instruction. The calculated excitation current is multiplied with the boost coefficient K to become the excitation current instruction. The boost coefficient K is determined based on the function g(t) of the time t from the time of rise of the magnetic flux. The difference obtained by subtracting the excitation current feedback from the voltage conversion device 6 from the excitation current instruction multiplied with the boost coefficient K is input to the current controller 52 to calculate the excitation voltage instruction which is output through the dq-uvw converter (not shown) to the voltage conversion device 6. Note that the excitation current feedback from the voltage conversion device 6 corresponds to the output of the uvw-dq converter 55 of FIG. 9, that is, the excitation (d-phase) actual current.

In FIG. 4, the boost coefficient K is processed as a function g(t) of the time t from the rise of the magnetic flux, but g(t) is a function which outputs a large excitation current so as to output a maximum allowable current from the voltage conversion device 6 from the rise of the magnetic flux to a predetermined time t1 and which outputs an exponentially falling current as a function of the time t after a predetermined time t1 passes.

To find g(t), it is necessary to find the time t1 for switching from the maximum excitation current corresponding to the maximum allowable current to an exponentially falling current. For this, the predetermined time t1 is found in accordance with $$t1=(R_2/L_2) \cdot \ln(D/(D-A/\phi^*)) \quad (4)$$

where the value of g(t) in the case of t≦t1, that is, the value of g(t) outputting the maximum excitation current value, is D, the magnetic flux instruction value is φ* and the value of the magnetic flux for switching the boost coefficient is A(<φ*).

In other words, before the magnetic flux reaches the magnetic flux instruction value φ*, the boost coefficient is switched at the time t1 when the magnetic flux is at a lower A lower than the magnetic flux instruction value φ*.

Therefore, when $t \leq t1$,
the boost coefficient K can be found as:

$$g(t) = \sqrt{(I\max^2 - (i_2^*)^2)}/i_d^* \quad (t \leq t1) \tag{5}$$

where Imax: maximum allowable current, $i_2^*$: torque current instruction, $i_d^*$: excitation current instruction. That is, with $t \leq t1$, the value of the function g(t) is made the value found from the maximum allowable current of the voltage conversion device 6.

When $t1 < t \leq T$,
the function g(t) determined by $$g(t) = 1 + (\sqrt{(I\max^2 + (i_2^*)^2) - 1}) \cdot \exp((-R_2/L_2)(t/t1 - 1)) \tag{6}$$
$$(t1 < t \leq T)$$

is made the boost coefficient K. The boost coefficient K=g(t) calculated by formula (6) is proportional to $\exp((-R_2/L_2)(t/t1-1))$ and becomes a value converged to "1".

Note that f(x) and g(t) can be realized not only by calculation of values as functions as explained above, but also by preparing a table and extracting values corresponding to the difference $\underline{x}$ or time from the table to obtain the values of f(x) and g(t).

Next, referring to FIGS. 5 to 8, examples to which the present invention is applied will be explained. In the examples explained below, the configurations other than those for explaining the excitation current control corresponding to the processing for raising the magnetic flux or the processing for changing the magnetic flux, for example, the configuration relating to the torque current control, dq-uvw coordinate conversion, etc. is omitted.

Figure 5:
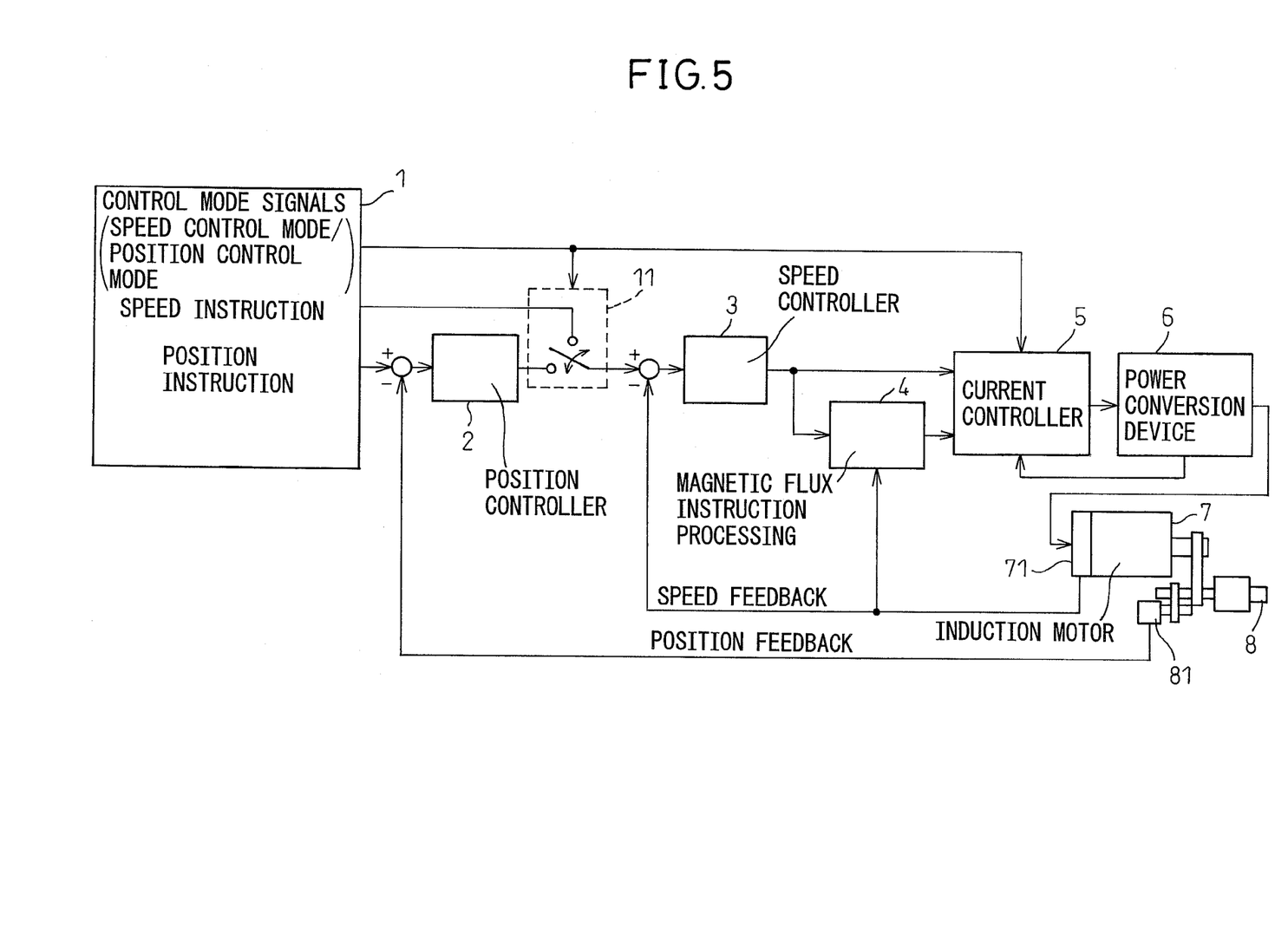
FIG. 5 is a view showing a first embodiment of application of the present invention.

FIG. 5 is a view explaining the control of the induction motor in the case of switching from the speed control mode where response is not required to position control mode where response is required. The induction motor 7 being controlled is provided with a speed sensor 71 detecting the speed of the induction motor 7 and a position sensor 81 detecting the rotational position of the shaft 8 of the induction motor 7. The control instruction unit 1 for outputting an instruction value for controlling the induction motor 7 outputs a control mode signal for switching between the speed control mode and the position control mode and outputs a speed instruction and position instruction.

When switching from speed control where the response of the torque output is not required to position control where the response of the torque output is required, the control instruction unit 1 outputs the position control mode, and the switching means 11 enables position control and strengthens the magnetic flux to secure the response of the torque.

With position control mode, the position difference obtained by subtracting the position feedback from the position sensor 81 from the position instruction output from the control instruction unit 1 is input to the position controller 2. The position controller 2 outputs a speed instruction corresponding to the input position difference. The speed difference obtained by subtracting the speed feedback obtained from the speed sensor 71 from the output speed instruction is input to the speed controller 3. The speed controller 3 outputs a torque instruction based on the input speed difference. The torque instruction is input to the current controller 5. On the other hand, the magnetic flux instruction processed from the torque instruction by the magnetic flux instruction processor 4 to strengthen the magnetic flux is input to the current controller 5. The current controller 5 outputs a primary current instruction to the voltage conversion device 6. The output of the voltage conversion device 6 is used to control the drive of the induction motor.

The current controller 5 of FIG. 5 employs a configuration for using a boost coefficient from the function f(x) of the difference $\underline{x}$ between a magnetic flux instruction and a magnetic flux estimation value (FIG. 2) or a configuration using a boost coefficient determined based on a function g(t) of the time $\underline{t}$ from the time of rise of the magnetic flux (FIG. 4). The excitation current instruction is multiplied to the boost coefficient calculated by either of these.

When finding the boost coefficient K from the function f(x) of the difference $\underline{x}$ between the magnetic flux instruction and the magnetic flux estimation value, as shown in FIG. 2, a boost coefficient processor 56 and a magnetic flux processor 57 are provided. Further, the function f(x) is found and the boost coefficient K is determined based on the difference $\underline{x}$ between the magnetic flux instruction input from the magnetic flux instruction processor 4 to the current controller 5 and the magnetic flux estimation value processed and output by the magnetic flux processor 57 to which the excitation current feedback is input. The excitation current calculated by the excitation current processor 51 is multiplied with the boost coefficient K and becomes the excitation current instruction.

The function f(x) determining the boost coefficient K, as defined in formula (3), becomes the smaller value of the value $\sqrt{(I\text{Max}^2 - (i_2^*)^2)}/i_d^*$ calculated from the maximum allowable current of the voltage conversion device supplying power to the induction motor or the value $f(x) = G \cdot x + 1$ calculated from the difference $\underline{x}$.

When finding the boost coefficient K from the function g(t) of the time $\underline{t}$ from the time of rise of the magnetic flux, as described in FIG. 4, a boost coefficient processor 58 having the function g(t) is provided. The time $\underline{t}$ from the time of rise of the magnetic flux is input to the boost coefficient processor 58 and the value of the function g(t) is used to determine the boost coefficient K. Further, the excitation current corresponding to the magnetic flux instruction is multiplied with the boost coefficient K to find the excitation current instruction.

The function g(x) determining the boost coefficient is, as defined in formula (5) and formula (6), determined as,
when $t \leq t1$, $$g(t) = \sqrt{(I\max^2 - (i_{2*})^2)} / i_d^*$$

and when $t1 < t \leq T$, $$g(t) = 1 + (\sqrt{(I\max^2 + (i_2^*)^2) - 1}) \cdot \exp((-R_2/L_2)(t/t1 - 1)).$$

Even when switching from speed control where response of the torque output is not required to position control where response of the torque output is required, by using such a boost coefficient K, the rise of the magnetic flux can be speeded. Further, overshoot can be avoided. Therefore, the time for convergence to the magnetic flux instruction value will never be delayed.

Figure 6:
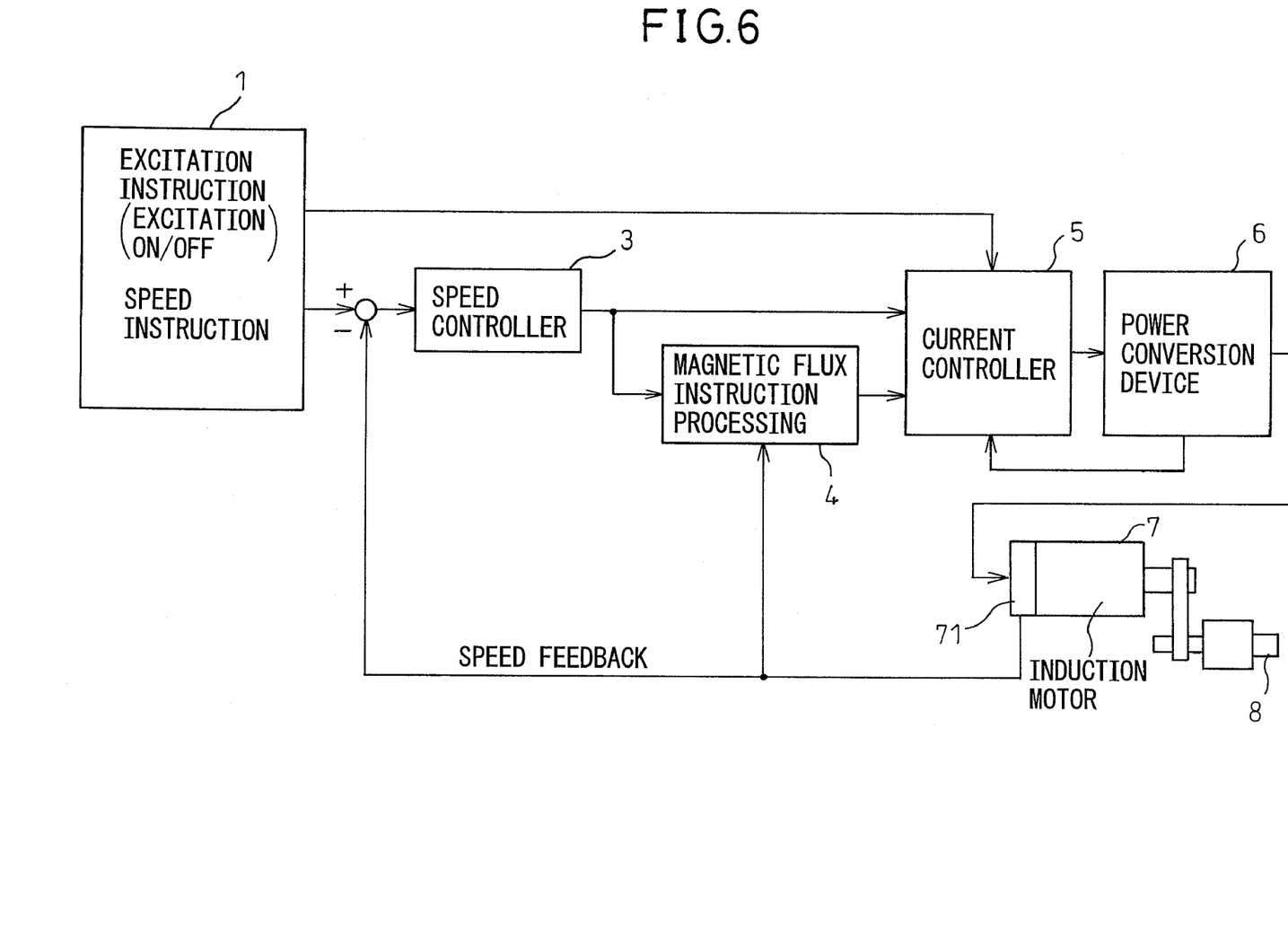
FIG. 6 is a view showing a second embodiment of application of the present invention.

FIG. 6 is a view for explaining the excitation current control of the induction motor at the time of switching from the non-excitation state to the excitation state.

The induction motor 7 to be controlled is for driving rotation of the shaft 8 and is provided with a speed sensor 71 for detecting the speed of the induction motor 7. The control instruction unit 1 for outputting an instruction value for control of the induction motor 7 is configured to output a drive instruction and speed instruction.

When switching from the non-excitation state where no magnetic flux is generated to the excitation state, the control instruction unit 1 outputs an excitation instruction for turning on the excitation and outputs a speed instruction.

The speed feedback obtained by the speed sensor 71 is subtracted from the output speed instruction to calculate the speed difference. This speed difference is input to the speed controller 3. The speed controller 3 outputs a torque instruction based on the input speed difference. The torque instruction is input to the current controller 5, Furthermore, the magnetic flux instruction processed from the torque instruction by the magnetic flux instruction processor 4 to generate the predetermined magnetic flux is input to the current controller 5.

In the control device of FIG. 6 as well, in the same way as FIG. 5, it is possible to employ a configuration using a boost coefficient found from the function f(x) of the difference $\underline{x}$ of the magnetic flux instruction and magnetic flux estimation value (FIG. 2) or to employ a configuration using a boost coefficient found from the function g(t) of the time $\underline{t}$ from the time of rise of the magnetic flux (FIG. 4). The configuration of the current controller 5 is similar to that of the control device of FIG. 5, so the explanation will be omitted.

Whichever boost coefficient is used, it is possible to quicken the time of rise from the non-excitation state to the excitation state and output a primary current instruction not allowing the occurrence of overshoot of the magnetic flux to a voltage conversion device 6.

Figure 7:
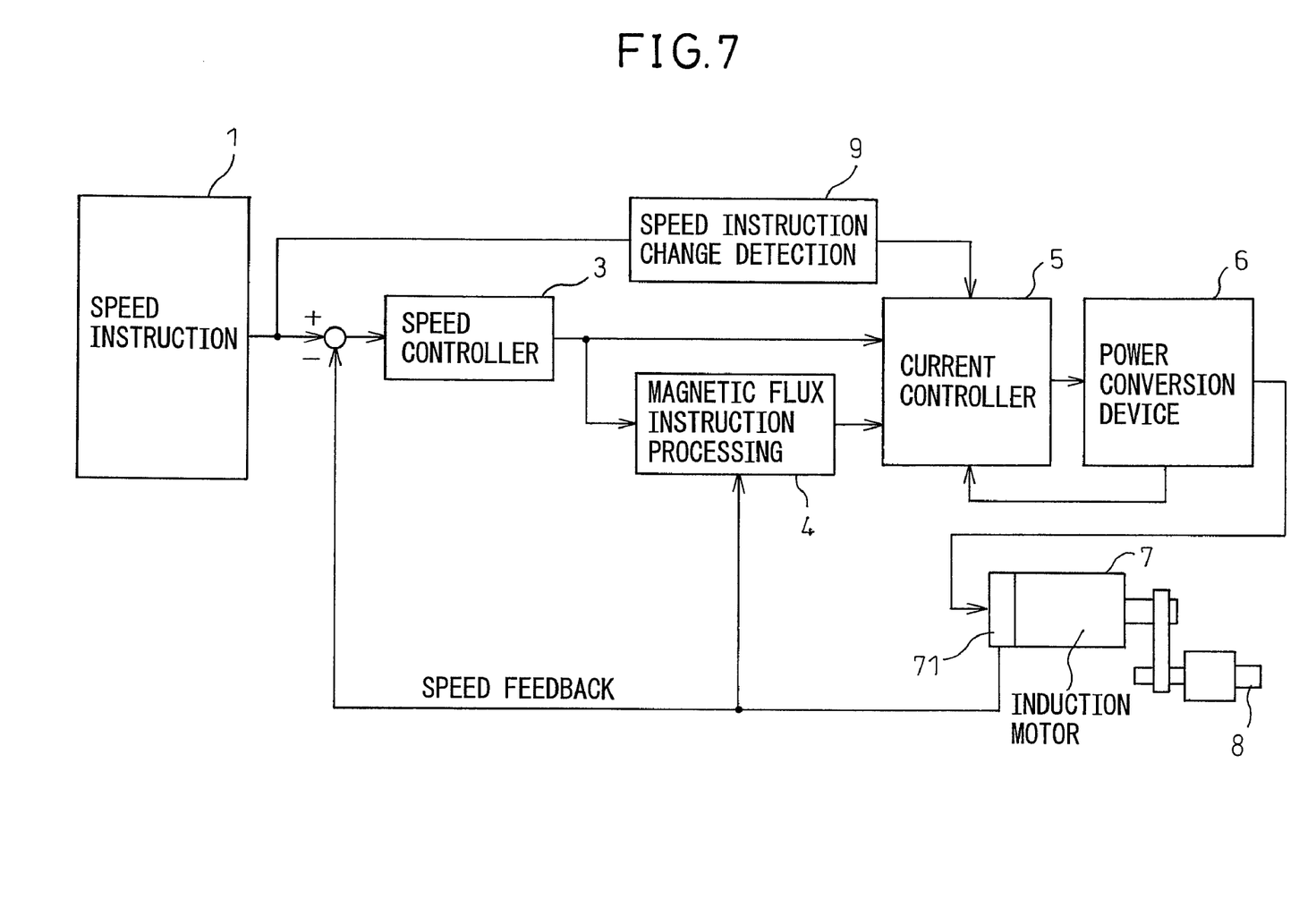
FIG. 7 is a view showing a third embodiment of application of the present invention.

FIG. 7 is a view showing the excitation current control of an induction motor when the speed instruction is changed.

FIG. 7 differs from FIG. 6 in that the control instruction unit 1 is not one outputting a control instruction for turning the excitation on/off, but has a speed instruction change detector 9 detecting the change of the speed instruction. The rest of the configuration is the same.

If the control instruction unit 1 changes the speed instruction, the speed feedback obtained by the speed sensor 71 of the induction motor 7 is subtracted from the changed speed instruction to calculate the speed difference. This speed difference is input to the speed controller 3. The speed controller 3 outputs the torque instruction based on the input speed difference. Due to the torque instruction, the magnetic flux instruction processor 4 outputs a magnetic flux instruction for generating the changed magnetic flux. This magnetic flux instruction is input to the current controller 5.

On the other hand, if the control instruction unit 1 outputs a changed speed instruction, the speed instruction change detector 9 detects each time the speed instruction is changed and inputs the speed instruction change detection signal to the current controller 5. Due to the input of the speed instruction change detection signal, the current controller 5 starts the magnetic flux raising processing multiplying the boost coefficient according to the present embodiment with the excitation current to strengthen the magnetic flux and generate a torque and quickly end the acceleration/deceleration until reaching the changed speed.

In the control device of FIG. 7 as well, in the same way as FIGS. 5, 6, it is possible to employ a configuration using a boost coefficient found from the function f(x) of the difference $\underline{x}$ between the magnetic flux instruction and the magnetic flux estimation value (FIG. 2) or possible to employ a configuration using a boost coefficient found from the function g(t) of the time $\underline{t}$ from the time of rise of the magnetic flux (FIG. 4). The configuration and functions of the current controller 5 are similar to those of the control device of FIG. 5, so the explanation will be omitted.

Whichever boost coefficient is used, if the speed instruction is changed, it is possible to speed the rising time of the magnetic flux and prevent the occurrence of overshoot of the magnetic flux by control, so it is possible to quickly end the acceleration/deceleration until reaching the changed speed.

Figure 8:
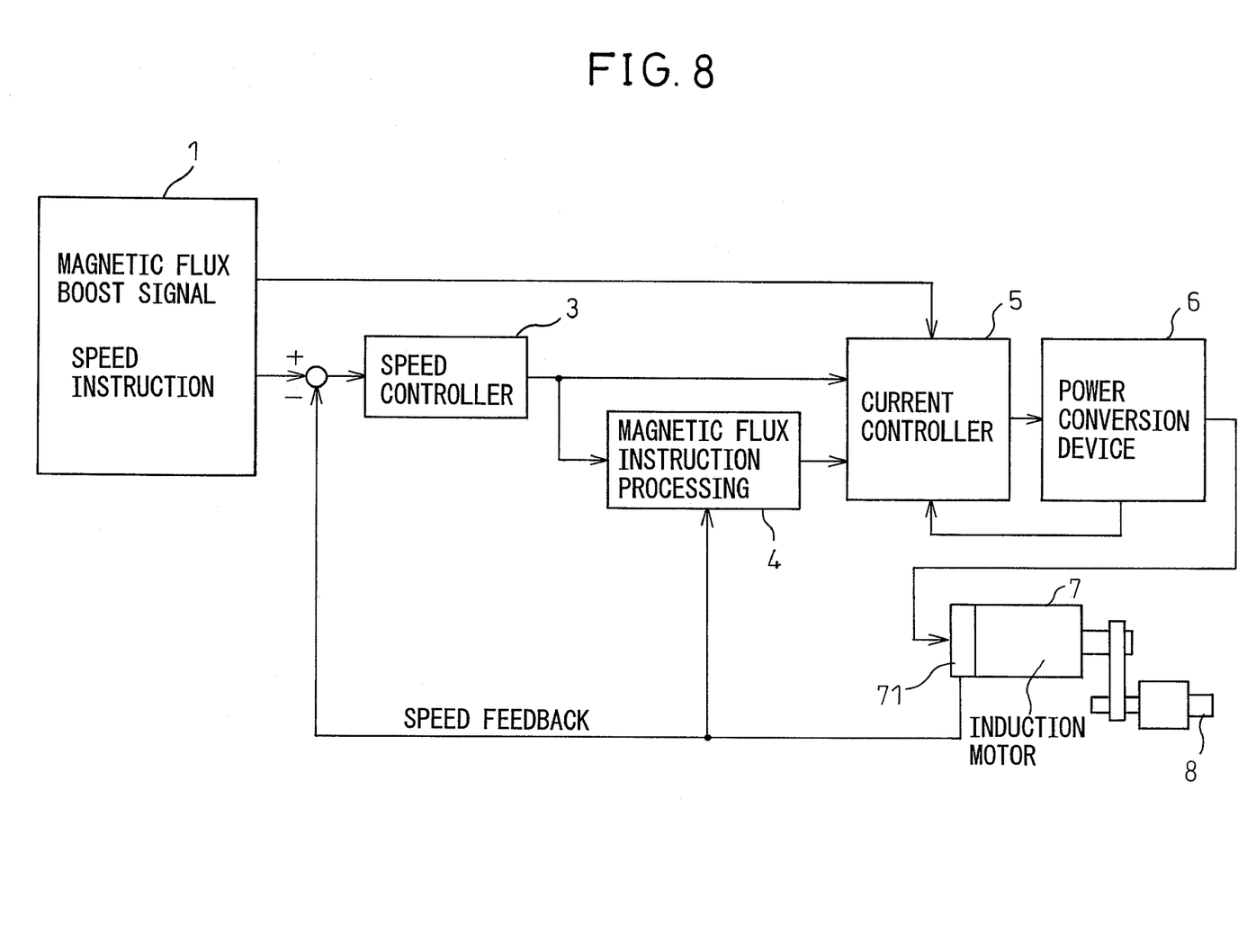
FIG. 8 is a view showing a fourth embodiment of application of the present invention.

FIG. 8 is a view showing the excitation current control when the processing or operation where instantaneous response of the torque is required is known in advance. The control device shown in FIG. 8 is configured so that the control instruction unit 1 outputs the magnetic flux boost signal to the current controller 5. Compared with FIG. 6, in FIG. 6, the control instruction unit 1 outputs a control instruction turning the excitation on/off to the current controller 5, while in FIG. 8, it outputs a magnetic flux boost signal to the current controller 5. The rest of the configuration is the same.

When the processing or operation where instantaneous response of the torque is required is known in advance, at that time, the control instruction unit 1 outputs a magnetic flux boost signal and inputs it to the current controller 5.

The current controller 5 starts the processing for raising the magnetic flux according to the present embodiment which multiplies the boost coefficient K with the excitation current upon the input of the magnetic flux boost signal so as to strengthen the magnetic flux and generate a torque.

In the control device of FIG. 8 as well, in the same way as FIGS. 5 to 7, it is possible to employ a configuration for using a boost coefficient from the function f(x) of a difference $\underline{x}$ between a magnetic flux instruction and a magnetic flux estimation value (FIG. 2) or a configuration for using a boost coefficient determined based on the function g(t) of the time $\underline{t}$ from the time of rise of the magnetic flux (FIG. 4). The configuration and functions of the current controller 5 are similar to those of FIGS. 2, 4, and 5, so the explanation will be omitted.

Whichever boost coefficient is used, if the magnetic flux boost signal is input to the current controller 5, it is possible to speed the rising time of the magnetic flux and prevent the occurrence of overshoot of the magnetic flux by control, so it is possible to quickly end the change of the desired torque.

While the invention has been described with reference to specific embodiments chosen for purpose of illustration, it should be apparent that numerous modifications could be made thereto by those skilled in the art without departing from the basic concept and scope of the invention.

What is claimed is:

1. An electric motor control device controlling an excitation current based on a magnetic flux instruction value and controlling a torque current based on a torque instruction value, comprising:

a coefficient processing means for processing a coefficient found as a function of a difference of said magnetic flux instruction value and a magnetic flux estimation value or a coefficient found as a function of a time from a start of rise of said magnetic flux, and an excitation current processing means for processing an excitation current instruction value based on an excitation current value corresponding to said magnetic flux instruction value and a coefficient processed by said coefficient processing means, wherein the processed excitation current instruction value is used to control the excitation current from the start of rise of said magnetic flux to when said magnetic flux reaches the magnetic flux instruction value.

2. The electric motor control device as set forth in claim 1, further comprising a power converter feeding drive power to an electric motor based on a torque current and excitation current,
   wherein the excitation current processed by said excitation current processing means is in a range where the size of the vector sum of the processed excitation current and the torque current does not exceed a maximum allowable current value of said power converter.

3. The electric motor control device as set forth in claim 2, wherein said excitation current processing means processes said excitation current instruction value when switching a control mode of an electric motor between a speed control mode and a position control mode.

4. The electric motor control device as set forth in claim 2, said excitation current processing means processes said excitation current instruction value when switching an electric motor from a non-excitation state to an excitation state.

5. The electric motor control device as set forth in claim 2, where said excitation current processing means processes said excitation current instruction value when a speed instruction value for said electric motor is changed.

6. The electric motor control device as set forth in claim 2, where said excitation current processing means processes said excitation current instruction value when a magnetic flux instruction value for said electric motor is changed.

7. The electric motor control device as set forth in claim 1, wherein said excitation current processing means processes said excitation current instruction value when switching a control mode of an electric motor between a speed control mode and a position control mode.

8. The electric motor control device as set forth in claim 1, said excitation current processing means processes said excitation current instruction value when switching an electric motor from a non-excitation state to an excitation state.

9. The electric motor control device as set forth in claim 1, where said excitation current processing means processes said excitation current instruction value when a speed instruction value for said electric motor is changed.

10. The electric motor control device as set forth in claim 1, where said excitation current processing means processes said excitation current instruction value when a magnetic flux instruction value for said electric motor is changed.

* * * * *